(12) United States Patent
Yasui (10) Patent No.: US 6,592,767 B1
(45) Date of Patent: Jul. 15, 2003

(54) APPARATUS AND METHOD FOR OZONE-TREATING BIOSLUDGES

(75) Inventor: Hidenari Yasui, Atsugi (JP)

(73) Assignee: Kurita Water Industries, Ltd., Tokyo (JP)

( * ) Notice: Subject to any disclaimer, the term of this patent is extended or adjusted under 35 U.S.C. 154(b) by 0 days.

(21) Appl. No.: 09/618,226

(22) Filed: Jul. 18, 2000

Related U.S. Application Data (62) Division of application No. 09/154,427, filed on Sep. 16, 1998, now Pat. No. 6,146,521.

(30) Foreign Application Priority Data

Sep. 19, 1997  (JP) .............................................. 9-255598

(51) Int. Cl.[7] .................................................. C02F 1/78
(52) U.S. Cl. ........................ 210/752; 210/760; 210/137
(58) Field of Search ................................ 210/137, 752, 210/758, 760

(56) References Cited

U.S. PATENT DOCUMENTS 4,250,040 A * 2/1981 LaRaus
4,695,388 A * 9/1987 Long, Jr.
5,145,582 A * 9/1992 Krofta

* cited by examiner

*Primary Examiner*—Betsey Morrison Hoey
(74) *Attorney, Agent, or Firm*—Flynn, Thiel, Boutell & Tanis, P.C.

(57) ABSTRACT

An apparutus and a method for ozone-treating biosludges and reducing biosludges occurring upon a biological treatment of aqueous organic waste, wherein the apparatus is made up of a plurality of reactors for effecting the ozone treatment of the biosludge by contacting the biosludge with an ozone-containing gas, biosludge passages for flowing the biosludge to be ozone-treated through all the reactors in series, gas supply means for supplying the ozone-containing gas to each of the reactors, a pressurization means for maintaining each of the reactors under a pressurized condition and stirrers each disposed in each reactor for realizing a nearly equalized ozone absorption rate for all the reactors.

4 Claims, 6 Drawing Sheets

Space Velocity of Gas at N.T.P. (hr⁻¹)

APPARATUS AND METHOD FOR OZONE-TREATING BIOSLUDGES

This is a division of Ser. No. 09/154 427, filed Sept. 16, 1998 now U.S. Pat. No. 6,146,521.

FIELD OF THE INVENTION

The present invention relates to an apparatus and a method for ozone-treating biosludges, such as activated sludge, digested sludge and the like, occurring in the biological treatment of aqueous organic wastes and to a method for such ozone treatment.

BACKGROUND OF THE INVENTION

In an aerobic or anaerobic biological treatment of an aqueous organic waste, biosludges are formed, such as activated sludge and digested sludge. While excessive biosludges formed in the biological treatment system should be removed therefrom, they exhibit a high biological stability, which makes the disposal of such biosludges through biodegradation or biolysis difficult. In addition, they are highly resistant to dehumidification, which makes disposal of such biosludges by dewatering difficult. Under the contemplation of solving the problem of disposal of such biosludges occuring upon biological treatment of aqueous organic wastes, a technique was proposed for a biological treatment of such biosludges, which comprises subjecting the biosludge to an ozone treatment and recycling the so-ozonized biosludge to the original biological treatment of the waste by an activated sludge in order to subject it to a biolysis (Japanese Patent Kokai Hei-7-206088). In this technique, by an ozone treatment, the biosludges are converted into BOD components susceptible to biological metabolization by the living microorganisms in the activated sludge and decomposition into gases and inorganic substances.

The method for ozone-treating excess amounts of the biosludge of this prior art uses an apparatus in which an ozone-containing gas is blown into a layer of a biosludge contained in an ozonizing reactor to cause a gas/liquid contact to facilitate the ozonization of the biosludge. The reactor used in the apparatus of the prior art is designed to be filled with the biosludge up to a liquid depth of about 1 meter or so and to blow the ozone-containing gas thereinto under atmospheric pressure, so that only a relatively low ozone concentration in the liquor can be attained for effecting the ozonization, resulting in a lower yield of ozonization. Thus, it is necessary for increasing the ozonization yield in this prior art to increase the biosludge residence time in the reactor and an efficient ozonization cannot be expected.

For improving such circumstances, a technique was proposed, in which the ozone treatment of biosludge is effected with an ozone-containing gas under an elevated pressure (Japanese Patent Kokai Hei 8-192196). While this technique attains an increased ozone absorption rate due to the elevated pressure, problems still remained, for example, in the poor contacting efficiency of the ozone-containing gas with the biosludge when the gas is simply blown thereinto and, when a gas distribution device, such as a porous gas diffuser disc, is employed for blowing the gas thereinto, it is easily clogged by the biosludge particles deposited thereon.

In order to remedy such problems, a technique has been proposed in which the ozone-containing gas is introduced into the reactor by supplying the gas to a downflow pipe disposed in the reactor for flowing the biosludge downwards therethrough using a circulation pump to cause circulation of the liquor in the reactor together with the gas bubbles supplied. This technique can serve for a stable operation of the apparatus without suffering from the occurrence of clogging of the gas supply element, nevertheless, it tends to suffer from a lower efficiency of the circulation pump and tends to prevent the occurrence of complete mixing. When the original liquor is sprayed over a foam layer for destroying the foam, the spray nozzle often becomes clogged. When a technical measure of distributing the ozone-containing gas by installing a stirrer in the reactor is employed, an increase in the residence time of the biosludge in the reactor is unavoidable, resulting in an increase in a tendency of the occurrence of foaming, together with possible short circuiting or insufficient mixing of the biosludge, causing a decrease in the ozone treating efficiency and reducing the rate of elimination of the excess biosludge.

SUMMARY OF THE INVENTION

An object of the present invention is to provide an apparatus and a method for ozone-treating biosludges in which an efficient, absorption of ozone by a biosludge can be attained at a high absorption rate and under a high load to effect an efficient ozone treatment of the biosludge at a high efficiency of power consumption and at a high rate of reduction of the biosludge, while suppressing the occurrence of foaming and preventing clogging of the gas distributor.

The above object of the present invention can be attained by an apparatus and a method as defined below:

(1) An apparatus for ozone-treating biosludges, comprising
   a plurality of reactors for effecting the ozone treatment of the biosludge by contacting the biosludge with an ozone-containing gas,
   biosludge passages for flowing the biosludge to be ozone-treated through all the reactors in series,
   gas supply means for supplying the ozone-containing gas to each of the reactors,
   a pressurization means for maintaining each of the reactors under a pressurized condition and
   stirrers disposed in each reactor for realizing a nearly equalized ozone absorption rate (g-ozone/hr per reactor) for all the reactors.

(2) A method for ozone-treating biosludges, comprising passing the biosludge to be ozone-treated through a plurality of ozone-treating reactors in series, while supplying an ozone-containing gas to each of the reactors with the agitation of the biosludge under a pressurized condition in such a manner that a nearly equalized ozone absorption rate is realized in all the reactors.

DETAILED DESCRIPTION OF THE INVENTION

The biosludges to be treated by the method according to the present invention include those which occur in aerobic and anaerobic biological treatments of aqueous organic wastes, such as activated sludge and digested sludge, preferably those which are composed predominantly of biosludge of living microorganisms, such as the so-called excess sludge, though biosludges containing some inorganic ingredients as in the so-called coagulated or flocculated sludge may also be included.

As the ozone-containing/gas, for example, ozonized air and ozone-containing oxygen may be used, wherein the ozonized air produced by passing pressurized dry air through an ozone generator is preferred in general.

According to the present invention, the ozone treatment of the biosludges is effected by passing the ozone-containing gas through a plurality of (preferably three) ozonizing reactors in series, each charged with biosludge-containing liquor, so as to effect an intimate contact of the gas with the biosludge in each reactor. The ozonizing reactor may be designed so as to effect the contact of the ozone-containing gas with the biosludge by stirring the liquor using a stirrer together with the ozone-containing gas introduced thereinto under an elevated pressure to facilitate the ozone absorption and, thus, the ozonization of the biosludge. The ozone-containing gas may be supplied to the plurality of reactors either in a series flow or in a parallel flow.

The stirrer may preferably be arranged within the reactor so that the rotating stirring element thereof confronts the entrance of the ozone-containing gas into the reactor. The pressure of the ozone-containing gas may preferably be in the range of 0.05–0.5 MPa (gauge); preferably 0.1–0.2 MPa (gauge), which may be adjusted by making use of the discharge pressure from the ozone generator and by using a pressure regulating valve disposed at the outlet of the reactor. The ozonizing reactors are operated so as to attain a nearly equalized (within ±20%) ozone absorption rate for all the reactors by adjusting, for example, the reactor capacity and the stirring strength.

By contacting the ozone-containing gas with the biosludge under a pressurized state in the manner as the ozone absorption efficiency can be increased. By increasing the internal pressure of the reactor, the volume of the ozone-containing gas existing in the reactor is reduced, whereby the performance of the apparatus can be incresed in proportion to the internal pressure. Thus, for example, if the internal pressure of the reactor is 0.098 MPa (gauge), the volume flow rate of gas is reduced to ½ of that under atmospheric pressure, so that a doubled performance of the reactor becomes possible.

According to the present invention, the biosludge to be ozone-treated is passed through a plurality of ozone treating reactors in series, while supplying an ozone-containing gas to each of the reactors with an adjusted strength of agitation of the biosludge under a pressurized condition in such a manner that a nearly equalized ozone absorption rate is realized in all the reactors, whereby a high ozone treating efficiency and, thus, a high rate of reduction of biosludge formation can be attained. Here, it is made possible to reduce the residence time of the biosludge in each reactor and to reduce the occurrence of foaming in the reactor. By operating the reactors so as to attain a nearly equalized ozone absorption rate in all the reactors, the ozone treatment efficiency can be increased with a simultaneous increase in the power consumption efficiency.

In the continuous ozone treatment of biosludges by supplying an ozone-containing gas and the biosludge continuously to a ozonizing reactor, the reaction efficiency is, in general, lower as compared with a batch-wise ozone treatment, because the resulting ozonized biosludge is inevitably mixed with the biosludge supplied thereto. Here, however, the reaction efficiency can be increased by performing the ozone treatment in a so-called plug flow principle in which the ozone-containing gas is supplied to the reactor in a parallel flow with the stream of the biosludge supplied thereto. According to the present invention, the ozonizing zone of the reaction system is allotted to a plurality of sections, each consisting of an isolated reactor and of which is supplied with the ozone-containing gas, whereby the integral ozonization reaction can be effected in a way quite similar to that based on the plug flow principle and, thus, an increase in the reaction efficiency can be attained. When the supply of ozone is performed completely equally, an ideal plug flow can be simulated and the reaction effciency can further be increased.

As described above, an apparatus and a method for ozone-treating biosludges which can attain a high ozone absorption rate with a high ozonizing performance while suppressing the foaming phenomenon and without suffering from the occurrence of the clogging of the gas supply means can be realized according to the present invention by incorporating the inventive feature that the biosludge-containing liquor is caused to pass through a plurality of ozonizing reactors in series, while the ozone-containing gas is supplied to each of the reactors under a pressurized condition in such a manner that a nearly equalized ozone absorption rate in all the reactors will be attained.

By installing three reactors, the efficiencies of ozonization and of power consumption are increased. An efficient utilization of ozone can be attained by supplying the ozone-containing gas to all the reactors in series, whereby the ozone treatment can be effected economically with a lower total ozone dose. In contrast, in the case where the ozone-containing gas is supplied to all the reactors in parallel, reactors of the same design can be installed so as to perform the ozonizing reaction in all the reactors under nearly the same conditions, whereby an easy operation of the apparatus can be obtained with a lower investment cost for the reactors.

By installing the stirrer element in a position confronting the inlet opening for the ozone-containing gas, a high dispersion of the gas in fine bubbles over the mass of the biosludge can be attained, whereby the power consumption efficiency can be increased. When a foam-destroying rotary impeller is arranged in the reactor at a position near the liquid level, such a phenomenon as concentration of the biosludge caused by being lifted on a foam layer formed on the liquid level can be prevented, whereby the ozonization efficiency is increased.

THE BEST MODE FOR EMBODYING THE INVENTION

Now, the present invention is described by way of its embodiments.

Figure 1:
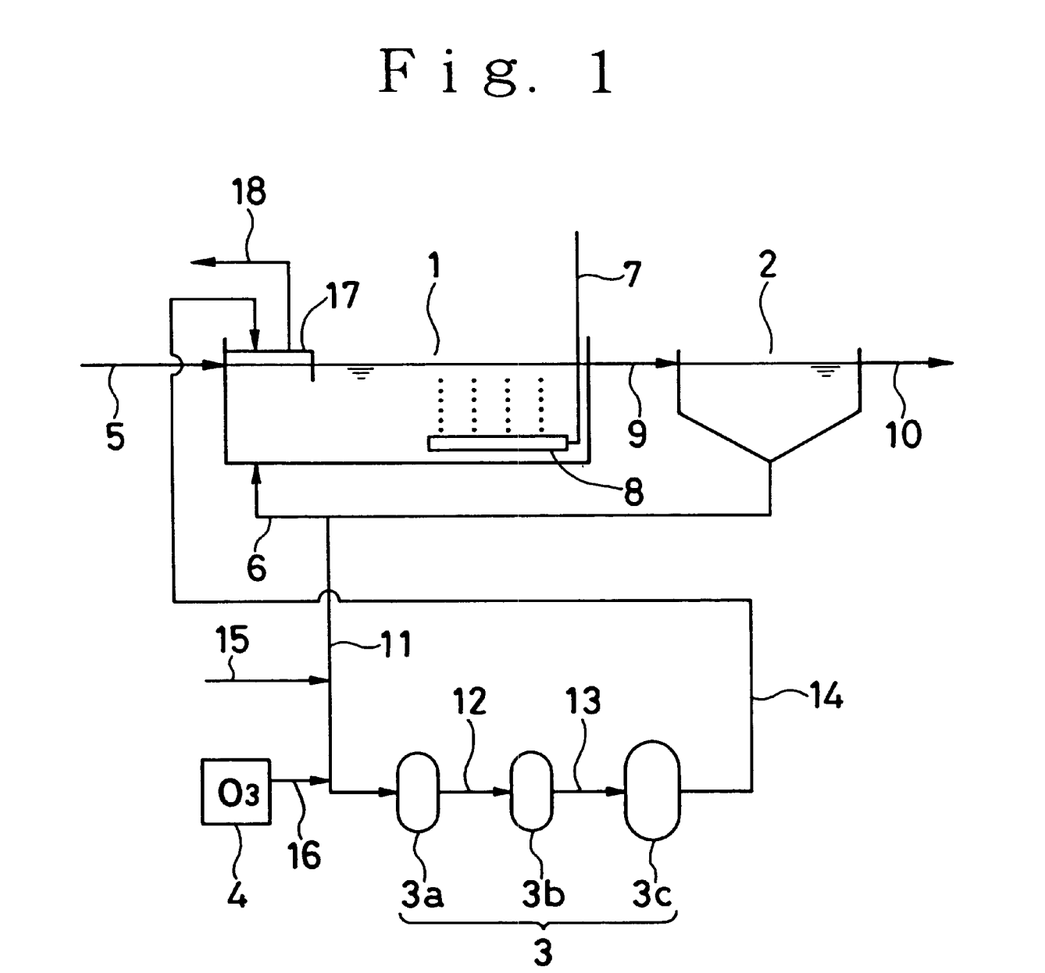
FIG. 1 shows a flow diagram for an arrangement for biological treatment of aqueous organic waste in which an embodiment of the apparatus for ozone-treating according to the present invention is incorporated.
Figure 2:
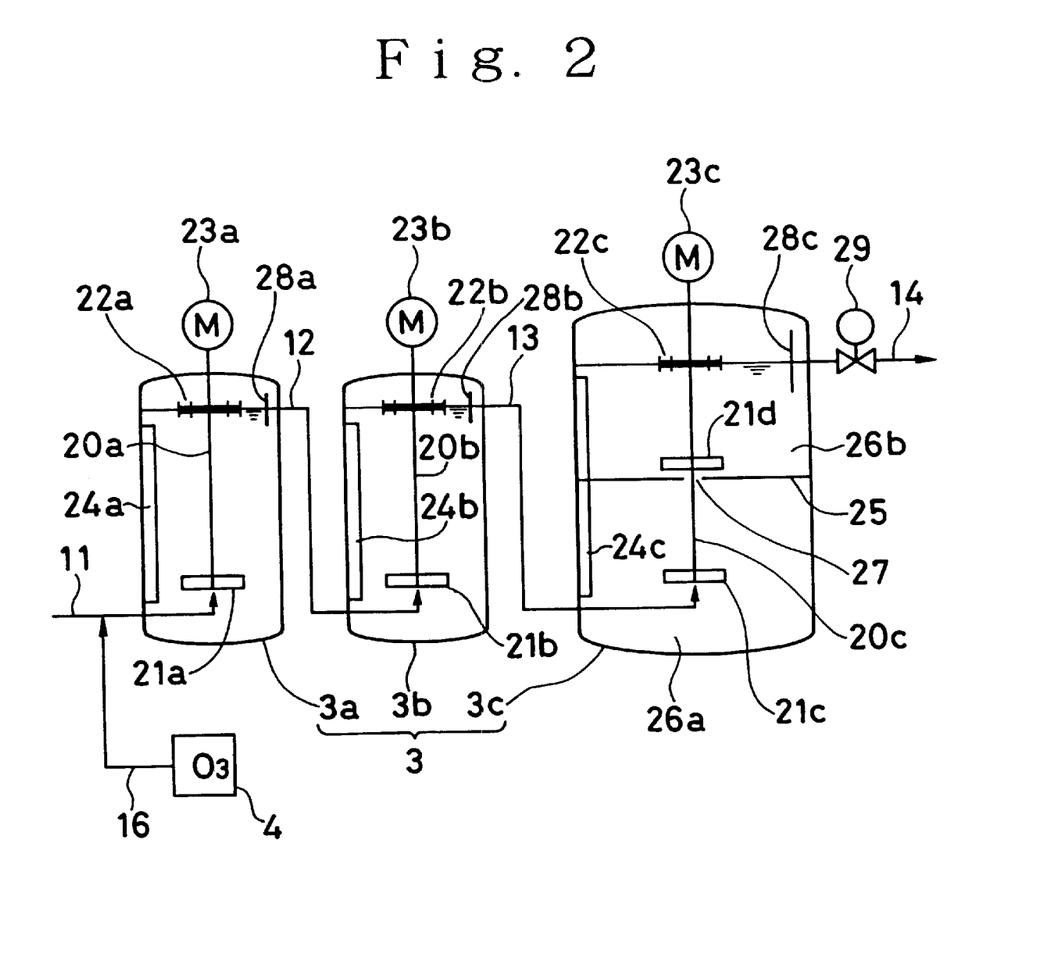
FIG. 2 is a flow diagram of an embodiment of the apparatus for ozone-treating according to the present invention.

A flow sheet of an arrangement for a biological treatment of biosludges provided with the apparatus for ozone-treating the biosludge according to the present invention is shown in FIG. 1. The apparatus for ozone-treating the biosludge is shown in FIG. 2 also in a flow sheet.

The arrangement given in FIG. 1 comprises an aeration tank 1, a settling basin 2 and an ozone-treating unit 3 with an ozone generator 4. The aeration tank 1 is connected with an aqueous organic waste supply line 5 and a biosludge return line 6 and is provided internally with an air distributor 8 communicating with an air supply line 7. A line 9 connects the aeration tank 1 with the settling basin 2 to which a treated liquor discharge line 10 and the biosludge return line 6 are connected. The ozone-treating unit 3 comprises a first, a second and a third reactor 3a, 3b and 3c. The first reactor is connected with a biosludge passage 11 branched from the biosludge return line 6 and the three reactors are connected in series by connection lines 12 and 13 disposed between the first and the second reactors and between the second and third reactors, respectively. To the biosludge passage 11 is connected an acid injection line 15 and an ozone injection line 16 connected to the ozone generator 4. The ozonized sludge transfer line 14 communicates with the aeration tank 1 via a gas/liquid separator 17 which communicates with an ozone decomposer (not shown) via a spent ozone line 18.

Using the arrangement given above, an aqueous organic waste is biologically treated under an aerobic condition in the following manner. In order to effect an aerobic biological treatment, the aeration tank 1 is supplied with the aqueous organic waste via the waste supply line 5 and with air via the air supply line 7 through an air distributor 8, while returning the biosludge settled in the settling basin 2 to the aeration tank 1. The aerated liquor in the aeration tank 1 is transferred via the line 9 to the settling basin 2 where it is subjected to a solid/liquid separation. The separated liquor is discharged out of the treatment system via the treated liquor discharge line 10 and the separated biosludge is returned to the aeration tank 1 via the biosludge return line 6.

The above-mentioned treatment is an ordinary aerobic biological treatment and, in general, a large amount of excess sludge is formed during the treatment. In order to reduce the amount of the formed biosludge, a part of the so-formed sludge is withdrawn from the treating system via the biosludge passage 11 and is subjected to the ozone treatment by acidifying it to a pH of 2.5–3.5 by introducing thereinto an acid, such as sulfuric acid or hydrochloric acid, and injecting an ozone-containing gas into the so-acidified sludge from the ozone generator 4 via the ozone injection line 16. The biosludge is converted by the ozone treatment into an easily biodegradable BOD component and the resulting ozone-treated mass is sent to the gas/liquid separator 17 via the ozonized sludge transfer line 14, from which the separated biosludge is guided into the aeration tank 1 and the separated spent ozone-containing gas is forwarded to an ozone decomposer via the spent ozone line 18.

The details of the ozone-treating, unit 3 are shown in FIG. 2. The biosludge passage 11 opens into the first reactor 3a at its lower portion. The connection lines 12 and 13 are arranged to connect between an upper portion of the first reactor 3a and a lower portion of the second reactor 3b and between an upper portion of the second reactor 3b and a lower portion of the third reactor 3c, respectively. The ozonized sludge transfer line 14 is guided from an upper portion of the third reactor 3c and opens into the gas/liquid separator 17. Each of the first, second and third reactors 3a, 3b and 3c, is provided with a stirrer 20a, 20b, 20c rotated by a motor 23a, 23b, 23c and having a stirring element 21a, 21b, 21c in a form of a turbine in position confronting the opening of biosludge passage 11 or of connection line 12, 13, respectively, and a foam-destroying impeller 22a, 22b, 22c in a form of a comb at a portion near the liquid level. On the inner face of the side wall of each of the reactors 3a, 3b and 3c, a plurality of upright baffling plates 24a, 24b and 24c are arranged at nearly an equal interval.

The third reactor 3c has a capacity greater than those of the first and second rectors 3a and 3b. The third reactor is provided at its middle height with a partition wall 25 to divide the reaction chamber into a plurality of sections 26a and 26b. The stirrer 20c has a further stirring element 21d within the section 26b above a hole 27 piercing the partition wall 25. For the stirring elements 21a, 21b and 21c, those of a flat disc turbine type having vertically directing blades may preferably be employed. The stirring element 21d may preferably be constituted of a type of pitched disc turbine having inclinedly directing blades for causing an upward flow. For the stirring elements 21c and 21d, those having more blades than those of the stirring elements 21a and 21b may preferably be employed.

Each of the reactors 3a, 3b, 3c is provided internally with a guide element 28a, 28b or 28c in a form of a half-sectioned cylinder extending from above the liquid level to below it in opposition to the connection line 12 or 13 or to the ozonized sludge transfer line 14, respectively. The ozonized sludge transfer line 14 is provided with a ball valve 29. In the above-described arrangement, the reactors are each maintained at a pressure within the preferred range given above, by making use of the discharge pressure from the ozone generator for pressure elevation and adjusting the opening degree of the ball valve 29.

The size, the structure of the stirrer and the stirring strength of each reactor 3a, 3b and 3c are so selected that a nearly equalized ozone absorption rate is obtained for all the reactors. Here, a nearly equalized ozone absorption rate for all the reactors can be realized by designing the ozone gas transfer efficiency for a preceding reactor to be lower than that for the subsequent reactor, since the ozone-containing gas is supplied to the reactors in a parallel flow with the flow of the biosludge.

As an example, a calculation result with this arrangement at a nearly equalized ozone absorption rate for each of the reactors of 320 g $O_3$/hr, the generated amount of ozone by the ozone generator of 1,000 g $O_3$/hr and the integral ozone gas transfer efficiency for this arrangement of 96% is recited in Table 1 below. In the first reactor 3a, the ozone gas transfer efficiency is calculated as the quotient of 320 g $O_3$/hr by 1,000 g $O_3$/hr, namely 32%. In the second reactor 3b, the ozone gas transfer efficiency is calculated by the quotient 320/(1,000−320)=47%. In the third reactor 3c, it is calculated in the same manner to be 89% and the integral ozone gas transfer efficiency is calculated to be 96%.

TABLE 1

An example of calculated results of ozone absorption rate and ozone gas transfer efficiency in each reactor

|  | First reactor | Second reactor | Third reactor |
| --- | --- | --- | --- |
| Ozone absor. rate (g/hr) | 320 | 320 | 320 |
| Ozone inlet (g/hr) | 1,000 | 680 | 360 |
| Ozone outlet (g/hr) | 680 | 360 | 40 |
| Ozone gas transf. eff. | 32% | 47% | 89% |

In the method for ozone-treating the biosludge using the above-described arrangement, the biosludge to be subjected to the ozone treatment is supplied to the reactors via the biosludge passage 11 and is caused to pass through the reactors 3a, 3b and 3c in series, while injecting the ozone-containing gas from the ozone generator 4 into the biosludge passage 11. The contact of the ozone-containing gas with the biosludge is facilitated by operating the stirrers 20a, 20b and 20c in each reactor so as to reach a nearly equalized ozone absorption rate in all the reactors to convert the biosludge into a BOD component.

The ozone absorption rate can be adjusted by altering the stirring strength in each reactor so as to reduce the residence time of the biosludge in each reactor before it is transferred to the subsequent reactor, so that the occurrence of foaming of the biosludge is hardly possible. In order to prevent the biosludge from adhering on the bubbles formed in a small proportion and being lifted up therewith to cause concentration of the biosludge in a foam layer, the foam-destroying wings are driven into rotation. A mixed stream of the biosludge and the gas in this de-foamed state is transferred from a portion near the liquid level to the subsequent reactor via the connection line 12 (or 13).

The third reactor 3c is designed to have a greater volume for increasing the ozone gas transfer efficiency, wherein the reactor is internally subdivided into a plurality of chambers 26a, 26b etc. by partition wall(s) 25 in order to prevent an extended residence time in each chamber. The stirring element 21d has blades or vanes arranged in an inclined direction and causes a lifting stream into which the biosludge will be sucked and lifted up. At around the liquid level, the gas and the liquor are guided from above and from beneath, respectively, into the guide element 28c and are delivered out via the ozonized sludge transfer line 14. The pressures in the reactors 3a, 3b and 3c are maintained at a pressurized state by adjusting the ball valve 29.

Figure 3:
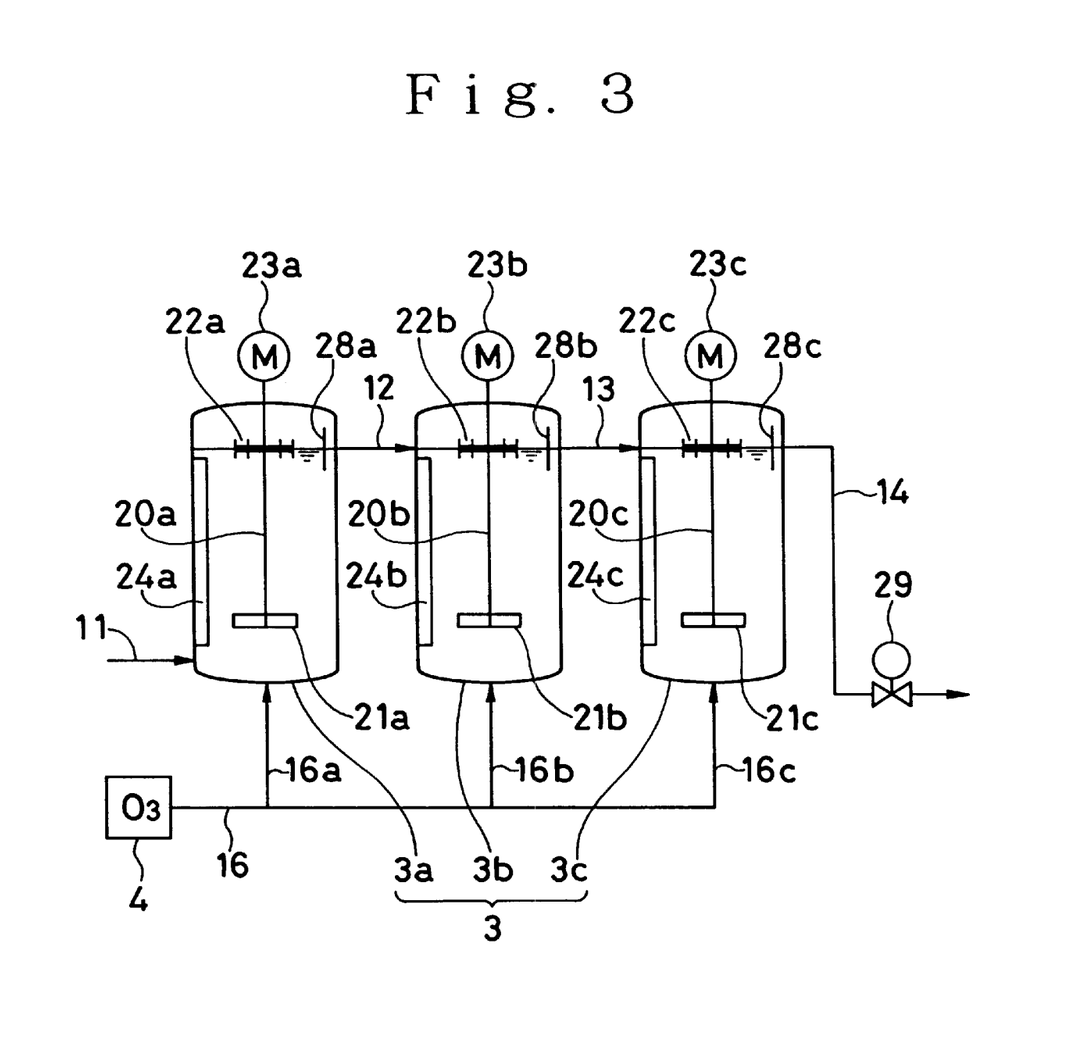
FIG. 3 is a flow diagram of another embodiment of the apparatus for ozone-treating according to the present invention.

Another embodiment of the ozone-treating unit is shown in FIG. 3 in a flow sheet, in which the ozone-containing gas is supplied to the reactors 3a, 3b and 3c in parallel. The reactors 3a, 3b and 3c are designed to have a configuration, structure and size nearly the same a each other and similar to those of the first and the second reactors 3a and 3b of FIG. 2. The ozone-injecting lines 16a, 16b and 16c are each branched from the line 16 from the ozone generator 4 and joins to the first, second and third reactors 3a, 3b and 3c at a lower position thereof. The connection lines 12 and 13 connect between an upper portion of the first reactor 3a and an upper portion of the second reactor 3b and between an upper portion of the second reactor 3b and an upper portion of the third reactor 3c, respectively. The guide elements 28a, 28b and 28c are arranged opposite to the connection line 12, to the connection line 13 and to the ozonized sludge transfer line 14, respectively.

For attaining a nearly equalized ozone absorption rate for all the reactors 3a, 3b and 3c by supplying them each with nearly the same amount of the ozone-containing gas in the above-described embodiment of the unit, all the reactors have the same design and are operated under the same conditions so as to attain a nearly equalized ozone absorption rate.

For example; when a total of 960 g $O_8$/hr is to be absorbed in the entire unit, each reactor is operated to attain an absorption of ⅓ of the ozone, namely, 320 g $O_3$/hr.

In order to attain an efficient absorption of the supplied ozone, the reactors are designed in their capacities and operation conditions so that an ozone absorption rate of 90% or higher should be reached in each reactor.

For performing the ozone treatment using the above-described embodiment of the unit, the biosludge is supplied to the first reactor 3a via the biosludge passage 11 and is caused to pass through the second and third reactors 3b and 3c, whereupon it is withdrawn from the unit via the ozonized sludge transfer line 14 through the ball valve 29, while introducing the ozone-containing gas through the ozone injection lines 16a, 16b and 16c into the reactors at a lower position thereof and while driving each stirrer 20a, 20b, 20c to effect contact of the ozone-containing gas with the biosludge.

The ozone absorption rate in all the reactors is settled at nearly the same level, wherein the unreacted ozone gas remaining in a preceding reactor is transferred together with the biosludge to the subsequent reactor, where they are further brought into contact with each other to further progress the ozone absorption. The guide elements 28a, 28b and 28c serve to guide the gas and the liquor from above and from beneath, respectively, and to prevent a possible short circuit of the newly introduced biosludge.

When an ozone treatment is performed under the same load as in the unit of FIG. 2 using the unit of FIG. 3, the integral ozone gas transfer efficiency may tend to decrease, nevertheless, the unit of FIG. 3 has an advantage of being easily manufactured because of the same structure and the same design of the reactors. Thus, the unit of FIG. 3 may preferably be employed in case the amount of the gas is small and the ozone generating cost can be disregarded. Whereas, the unit of FIG. 2 may preferably be employed in case the ozone generation cost should be regarded as important. In both of the units of FIGS. 2 and 3, the ozone-containing gas can be supplied only by means of the ozone injection lines 16, 16a, 16b and 16c without having recourse to any gas distributor or perforated plate, so that any possibility of clogging of the ozone injection means is avoided.

EXAMPLES

Below, the present invention is further described in more detail by way of Examples.

Example 1, Comparative Example 1

Experiments of a biological treatment of an aqueous organic waste including an ozone treatment of the biosludge occurred thereby was performed using the apparatuses shown in FIGS. 1 and 2.

The conditions of the biological treatment of the aqueous organic waste using the apparatus as shown in FIG. 1 were as given in the following Table 2:

TABLE 2

| Conditions of biological treatment of the aqueous organic waste | |
|---|---|
| Aeration tank volume | 1,900 m² |
| Influent BOD | 3,000 mg/l |
| Influent flow rate | 240 m³/day |
| Excess sludge prod. rate | 250 kg DS/day |
| Concentration of MLSS | 5,000 mg/l |

The particulars of the ozone-treating unit of FIG. 2 and the operation conditions thereof were as given in the following Table 3:

TABLE 3

|  | 1st reactor | 2nd reactor | 3rd reactor |
|---|---|---|---|
| Particulars of the unit | | | |
| Reactor volume (l) | 200 | 200 | 800 |
| Stirrer rated r.p.m. | 710 | 710 | 360 |
| Power of motor (Kw) | 1.5 | 1.5 | 5.5 |
| Stirrer disc turbine | flat, 4 vanes | flat, 4 vanes | flat & pitched, 6 vanes |
| Diameter of stirrer disc turbine | 170 mm | 170 mm | 320 mm |
| Operation conditions | | | |
| Flow rate of $O_3$-containing gas | 5–30 $Nm^3$/hr | | |
| Ozone concentration | 15–33 g/$Nm^3$ | | |
| Ozone gas transfer efficiency | 98% | | |
| Biosludge flow rate in operation | 5 $m^3$/hr | | |
| Biosludge concentration to be treated | 10,000 mg SS/l | | |
| Reactor pressure in operation | 0.07–0.17 MPa | | |
| Water temperature | 15–20° C. | | |

In the ozone-treating unit of FIG. 2, the first and the second reactors 3a and 3b have the same capacity of 200 liters and the third reactor 3c has a capacity of 800 liters. Each reactor is provided internally with four baffling plates (24a, 24b or 24c). For the stirring elements (21a, 21b, 21c, 21d), disc turbines are employed.

The biosludge and the gas flow through the reactors from the biosludge passage 11 and via the connection lines 12 and 13. The biosludge and the gas are introduced into each reactor at a position just below the stirring element (21a, 21b, 21c).

The rotational frequencies of the stirring elements 21a, 21b, 21c and 21d can be altered in a range from zero to about 120% by means of an inverter. For the stirring elements 21a and 21b, a four-vane flat disc turbine is employed. The third reactor is subdivided internally at a middle height thereof into two chambers by a partition wall in order to have a theoretical plate number of at least one. The stirring element 21c in the lower chamber consists of a 6-vane flat disc turbine and the stirring element 21d in the upper chamber consists of a 6-vane pitched disc turbine.

According to a preliminary experiment on a scale of a 2 liter reactor, it was recognized that a part of the biosludge was exhausted out of the exit pipe together with the foam occurring from the ozone treatment, whereby the biosludge concentration in the reactor was considerably decreased. This seemed to be similar to the behavior of SS separation in a pressure floating separator. For this reason, each reactor of the ozone-treatment unit of this experiment is provided internally at the position near the liquid level with a comb-shaped foam-destroying impeller (22a, 22b, 22c) in order to avoids a decrease in the biosludge concentration in the reactors.

The foam-destroying impeller is arranged so that its terminal end is submerged about 20 mm below the liquid level and driven to rotate so as to destroy foam on the liquid surface.

In the third reactor 3c, a half-cut guide elements 28c is arranged in a vertical posture in front of the reactor exit. The lower half of the guide element is held submerged in the liquid and the biosludge and the gas are guided thereinto from above and from below, respectively, and are then discharged out.

A comparison was made for the relationship between the space velocity of the gas based on the gas flow rate at N.T.P. ($Nm^8$/hr) and the ozone gas transfer efficiency observed using the above ozone-treating unit (Example 1) in comparison with that observed using an ozone-treating unit in which a down-flow ozone injection pipe for dispersing the ozone-containing gas is used in each reactor (Comparative Example 1) instead of using the stirrer of the present invention. The experimental results are recited in FIG. 4 in which the plots A represent the results of Example 1 and the plots B represents the results of Comparative Example 1.

Figure 4:
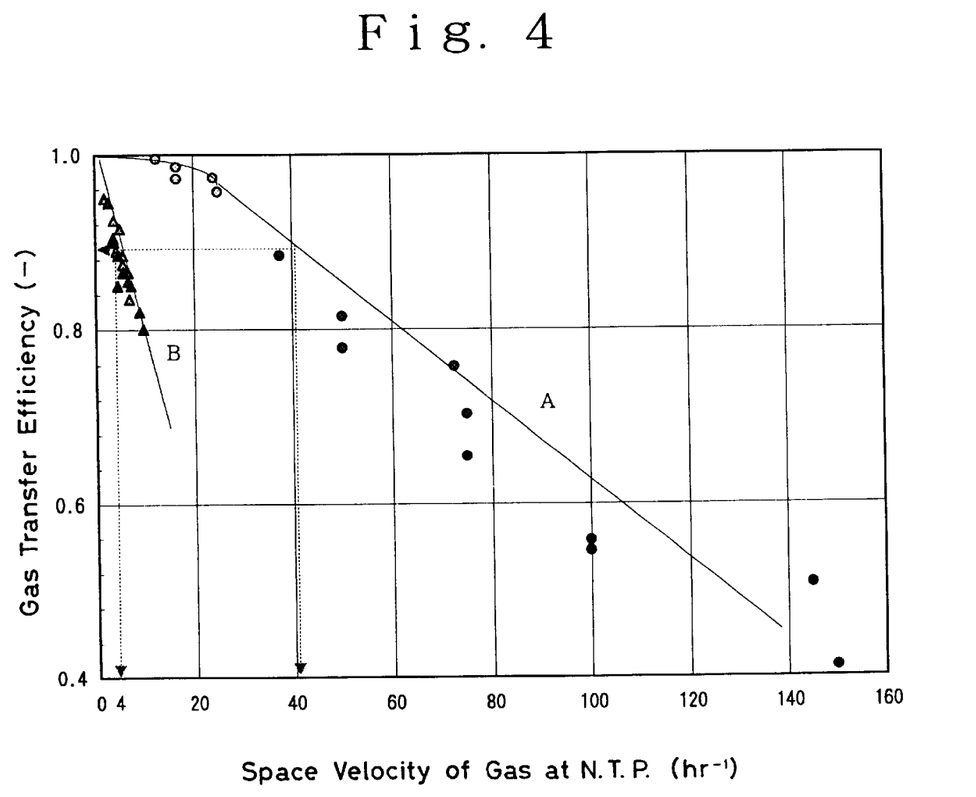
FIG. 4 is a graphical illustration of the experimental results of the Example of the present invention.

As seen in FIG. 4, it was made clear that a high load operation quite higher than that realized by the down-flow pipe ozone treating unit of Comparative Example 1 can be attained using the ozone-treating unit of Example 1 operated at the rated rotational frequency under an average internal pressure of 0.14 MPa (gauge). It is believed that a 90% gas transfer efficiency can be reached with the ozone-treating unit of Example 1 by operating at a gas SV of 40 $hr^{-1}$. In contrast, the ozone-treating unit of Comparative Example 1 requires a gas SV of some 4 $hr^{-1}$ for attaining the same result. Thus, it is seen that it is made possible by the ozone-treating unit of Example 1 to realize an operation under about a 10-fold higher load than that by the unit of Comparative Example 1.

From the above, it is seen that a high ozone absorption efficiency can be attained by the apparatus and the method according to the present invention, whereby the ozone treatment of biosludges is realized with a reduced residence time of the biosludge in the reactor.

In Example 1, the total power consumption for operating the reactors at an ozone-containing gas supply rate of 30 $Nm^8$/hr and at an ozone gas transfer efficiency of 95% was found to be 6 kWH. In contrast, the corresponding power consumption for operating the unit of Comparative Example 1 under the same condition was found to be 12–15 kWH. Thus, an increase in the power consumption efficiency amounting to at least two times that of Comparative Example 1 is obtained by the apparatus and method according to the present invention.

It was necessary for the downflow pipe ozone-treating unit of Comparative Example 1 to perform a periodical maintenance examination for detecting any occurrence of clogging of the biosludge spray nozzle. In the unit of Example 1, however, no maintenance is necessary, since no element suffering from clogging is included. Therefore, the apparatus and the method according to the present invention can attain a maintenance-free operation avoiding the corresponding maintenance cost.

The effect on the apparatus performance by the alteration of the number of reactors was examined using a unit corresponding to that of Example 1 at an ozone dosage (absorbed ozone/biosludge to be treated) of 1.5 g $O_3$/g SS. The operational conditions are given in Table 4.

TABLE 4

| | | Operational conditions | | | |
| --- | --- | --- | --- | --- | --- |
| | Number of | $O_3$ absorption proportion relative to absorbed total $O_3$ assumed to be 100 | | | |
| Run No. | Reactors | First reactor | Second reactor | Third reactor | Fourth reactor |
| 1 | 1 | 100 | — | — | — |
| 2 | 2 | 50 | 50 | — | — |
| 3 | 3 | 33 | 33 | 33 | — |
| 4 | 4 | 25 | 25 | 25 | 25 |

Under the above operational conditions, the effect of the number of reactors on the apparatus performance for the elimination of biosludge was examined. The amount of biosludge eliminated per day (kg DS/day) was determined according to the following equation: Daily elimination of biosludge (kg DS/day)

={(Amount of influent *BOD*)×0.35}−{(Amount of biosludge today in the aeration tank)−(Amount of biosludge yesterday in the aeration tank)}

In this equation, the numerical value 0.35 is the yield of biosludge per influent BOD.

The values for the amount of ozone-treated biosludge per day were determined by the arithmetic product of the amount of biosludge to be treated as given in Table 3 and the biosludge concentration. The amounts of biosludge were calculated cumulatively over the experiment period to determine the eliminated amount of biosludge and the amount of treated biosludge during the experimental period. The experimental results are shown in FIG. 5 in the relationship between the number of reactors and the amount of treated biosludge required for the biosludge elimination.

Figure 5:
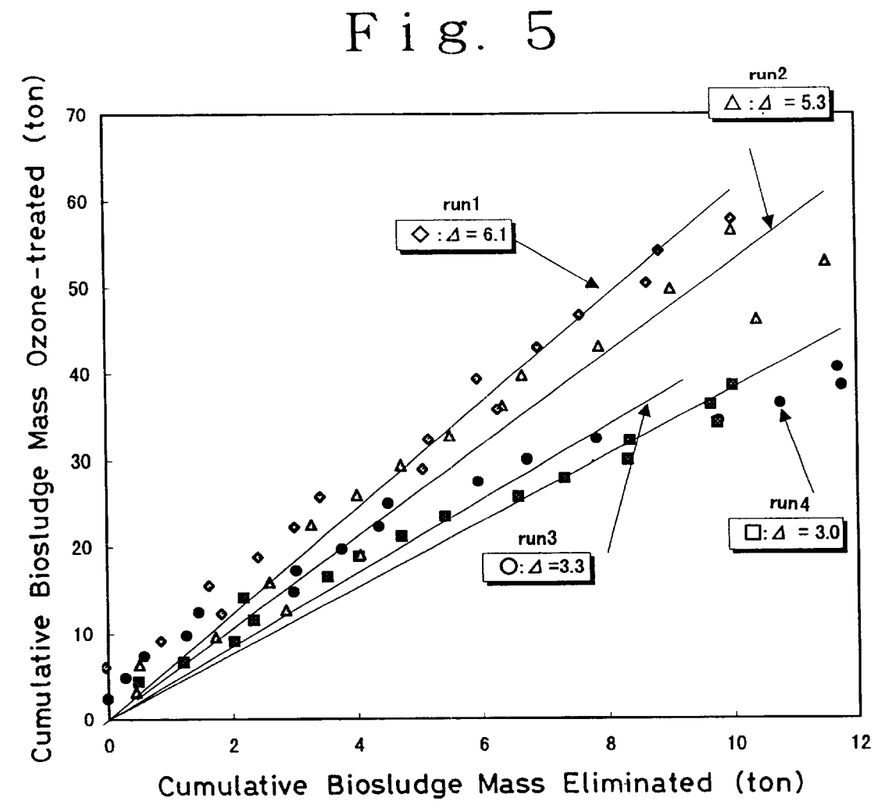
FIG. 5 is another graphical illustration of the experimental results of the Example of the present invention.

As seen in FIG. 5, the amount of treated biosludge required for the biosludge elimination is decreased as the number of reactors is reduced, even though the amount of ozone dosage is the same for all the runs. For reducing the amount of biosludge by a weight of 1 ton in the case of using one single reactor, 6.1 tons of biosludge were required to be ozone-treated. In contrast, when the number of reactors was increased to three, only 3.3 tons of biosludge were required to be ozone-treated for attaining an elimination of 1 ton of biosludge.

Therefore, it is seen that the amount of ozone required for attaining elimination of biosludge varies with the number of reactors. Since the amount of ozone required for eliminating the amount of biosludge is proportional to the amount of ozone-treated sludge as indicated below, the requisite amount of ozone can be reduced using a greater number of reactors.

($O_3$ required for biosludge elimination)(g $O_3$/g SS)=(Ozone dosage)×(Amount of biosludge treated by $O_3$)

Figure 6:
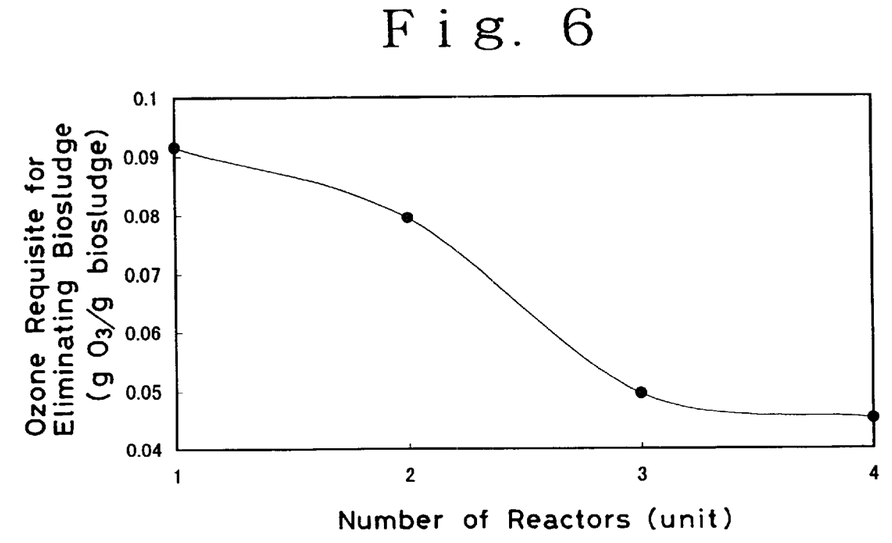
FIG. 6 is a further graphical illustration of the experimental results of the Example of the present invention.

The observed relationship between the number of reactors and the amount of ozone required for eliminating the biosludge is summarized in a graph which is given in FIG. 6. As seen in FIG. 6, the amount of ozone treated biosludge per unit amount of eliminated biosludge is held at a nearly constant value within the range of 3.0 times–3.3 times for the number of reactors of 3 and higher. Therefore, it is concluded that the minimum number of reactors for the apparatus according to the present invention should be 3 units.

Using three reactors, another experiment was carried out by altering the ozone absorption rate in each reactor. The experimental conditions were as given in Table 5:

TABLE 5

| | Experimental conditions | | |
| --- | --- | --- | --- |
| Run | $O_3$ reaction proportion relative to the reacted total $O_3$ assumed to be 100 | | |
| No. | 1st reactor | 2nd reactor | 3rd reactor |
| 5 | 80 | 10 | 10 |
| 6 | 70 | 20 | 10 |
| 7 | 33 | 33 | 33 |

Figure 7:
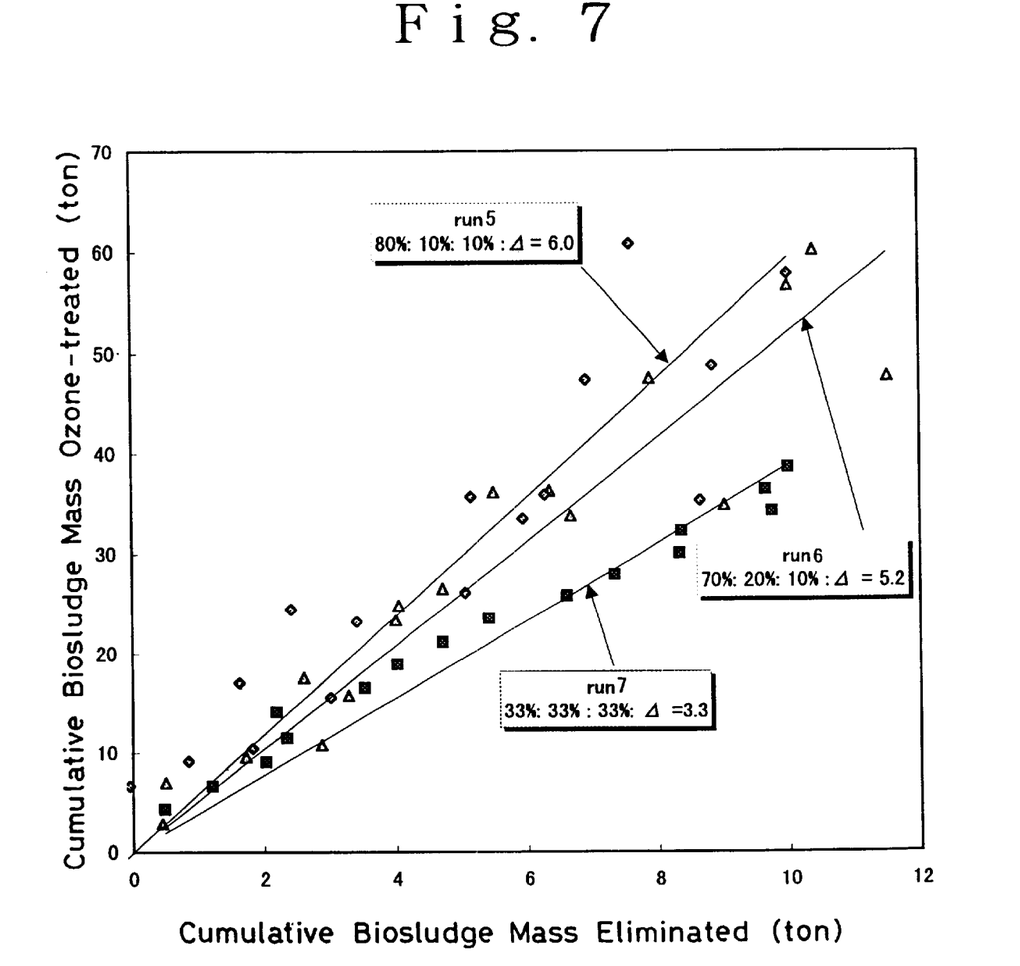
FIG. 7 is a still further graphical illustration of the experimental results of the Example of the present invention.

The experimental results are summarized in the relationship between the cumulative amount of ozone-treated biosludge and the cumulative amount of eliminated biosludge for evaluating the influence of amount of ozone reacted in the reactors on the effect of elimination of the biosludge, which is shown in FIG. 7.

As seen in FIG. 7, the amount of ozone-treated biosludge required for reducing the unit amount of the biosludge is in the order (run 5)>(run 6)>(run 7). When a larger amount of ozone was absorbed in the first reactor, a larger amount of biosludge to be treated was required for the biosludge elimination. While the reason therefor is not clear, it is believed that biosludge with a lower degree of ozonization may be shortcircuited from the preceding reactor, since each reactor is a complete mixing type. On the other hand, when the amount of ozone reacted in the reactor was equalized for all the reactors, the reaction proceeds according to a so-called plug flow principle. In this case, a reduction of biosludge can be expected, since a large amount of a biosludge mixture having a lower ozonization degree may not be exhausted from any reactor.

What is claimed is:

1. A method for ozone-treating biosludges, comprising passing the biosludge to be ozone-treated through a plurality of ozone treating reactors in series, while supplying an ozone-containing gas to each of the reactors with agitation of the biosludge under a pressurized condition in such a manner that a nearly equalized ozone absorption rate, within a deviation amount of 20%, is realized in all the reactors.

2. A method as claimed in claim 1, wherein three reactors are employed.

3. A method as claimed in claim 2, wherein the ozone-containing gas is supplied to the first, second and third reactors by flowing the gas through them in series.

4. A method as claimed in claim 2, wherein the ozone-containing gas is supplied to the reactors in parallel.

* * * * *